United States Patent Office 3,563,933
Patented Feb. 16, 1971

3,563,933
MOLDING COMPOSITION
David A. Stivers, St. Paul, Minn., assignor to Minnesota Mining and Manufacturing Company, St. Paul, Minn., a corporation of Delaware
No Drawing. Continuation of application Ser. No. 267,312, Mar. 22, 1963. This application Mar. 3, 1969, Ser. No. 803,936
Int. Cl. C08f 45/04; C08k 1/08
U.S. Cl. 260—41
7 Claims

ABSTRACT OF THE DISCLOSURE

The incorporation with vulcanizable highly fluorinated elastomers of inorganic fillers in the form of flakes and in quantity to reduce shrinkage during vulcanization or molding without materially detracting from the other physical properties of the vulcanite.

---

This application is a continuation application of U.S. Ser. No. 267,312 filed Mar. 22, 1963, now abandoned.

The present invention relates to a new and useful molding composition for fluorine-containing polymers. In one aspect, this invention relates to certain types of fillers for improving the molding characteristics of highly fluorinated elastomeric polymers. In still another aspect, this invention relates to a method for molding of fluorine-containing elastomers.

In recent years a new group of elastomers has been developed which are chemically and physically stable under various conditions. These elastomers are those prepared from highly fluorinated monomers. For optimum chemical and physical stability, many of these elastomers contain at least half of the hydrogen substituents on the carbon atoms substituted with fluorine. The elastomers are used for making various articles of manufacture, such as O-rings, gaskets, seals, diaphragms, washers and sheets which are used in corrosive and high temperature atmospheres. One of the severe handicaps in using these fluorinated elastomers is their tendency to shrink during molding. This shrinkage is much more than is normally encountered in the molding of hydrocarbon or non-fluorinated elastomers. As a result, it is very difficult if not impossible to use the same molds as are used for the molding of hydrocarbon elastomers because compensation must be made in the mold for the high shrinkage of the fluorinated elastomers. In fact, where tolerances are critical in the molded product, such as an O-ring, it has become impossible to meet the required specifications with the fluorinated elastomers. The reason for this high shrinkage appears to be that in almost every case, the molding is accompanied by a high thermal expansion of the compound which occurs as a consequence of the heat required to produce partial vulcanization. Further increase in shrinkage, compared with hydrocarbon rubbers, also occurs when vulcanization is completed by post-curing in an oven at high temperature over a relatively long period of time.

These fluorinated elastomers are known in the art and are the subject of numerous patents. Also, the technique of the preparation of the elastomers, as well as their vulcanization and molding, is known in the art. There are many vulcanization and curing recipes available.

Typical fluorinated elastomers include the copolymer of trifluorochloroethylene and vinylidene fluoride, the copolymer of perfluoropropene and vinylidene fluoride, fluorinated silicones which contain a fluorinated alkyl side group on the chain, the copolymer of perfluorobutyl arcylate and acrylic acid, and the homopolymer of perfluorobutadiene. The above are the most common fluorinated elastomers available today. However, there are many more such fluorinated elastomers which are either partially available or are on an experimental basis or are the subject of further development work. The gum properties of the raw elastomers are such that as in the hydrocarbon elastomers, vulcanization or curing of the product is necessary to achieve the desired elasticity, strength and hardness. Vulcanization of these elastomers, as indicated by the prior art is carried out with such vulcanization or curing agents as polyamines, carbamates, organic peroxides, polyisocyanates, polyalkylenamides, sulfur, basic metal oxides and irradiation with X-ray or gamma rays. As previously indicated, the curing procedure and the curing recipe are well-known to those skilled in the art.

It is much to be desired that a method or composition be provided to reduce the shrinkage of the fluorinated elastomers to less than 2½ %.

It is, therefore, an object of this invention to provide a new composition to reduce shrinkage during curing and molding of fluorinated elastomers.

Another object of this invention is to provide a method for curing and molding fluorinated elastomers.

Still another object is to provide a special filler which will reduce the shrinkage of fluorinated elastomers.

Various other objects and advantages will become apparent to those skilled in the art from the accompanying description and disclosure.

In accordance with this invention, it has been found that the inclusion of a special type of inorganic natural or synthetic filler in the molding composition of fluorinated elastomers will materially reduce the shrinkage of the elastomer. To achieve the maximum reduction in shrinkage, the inorganic filler must be in a form of a flake. It has been determined that such flake in which at least one dimension is at least five times, preferably at least 10 times, the other dimension reduces the shrinkage. The inorganic filler is in the form of a flake or flat plate in which at least two of the dimensions are greater than the third dimension, preferably by at least five times, more preferably at least 10 times. In contrast to the above, fillers in the form of spheres do not effectively reduce the shrinkage. Many fillers are available only in spherical form. Certain fillers are available, however, in flake or needle form. However, care must be taken in selecting the fillers in correct form because some of those fillers which are available in flake form of the required dimension are also available in unsatisfactory dimensional form such as spherical form. The most suitable fillers in flake form are graphite, talc, clay and mica. The size of the filler is generally not greater than 200 mesh.

It has been observed with such fillers that the shrinkage can be maintained less than 2½ % without affecting materially the elastomeric properties of the ultimate product. For example, hardness may be maintained within the required range of the cured product, and at the same time, shrinkage materially reduced.

Generally between about 5 and about 85 parts of the filler per 100 parts of elastomer are utilized. Sufficient filler is utilized within the above range to maintain the shrinkage, preferably at 2% or below. The quantity necessary to maintain the shrinkage at not more than 2% does not reduce the elastomeric properties of the cured product, and in general, the hardness is not above 95 Shore A.

Other materials may be included in the vulcanization recipe, such as pigments, vulcanization or curing accelerators and anti-oxidants, without departing from the scope of this invention. The use and type of materials for these purposes are well-known to those skilled in the art.

In accordance with this invention, the raw gum elastomer containing fluorine is admixed with a vulcanization or curing agent such as a diamine or a carbamate, a vulcanization accelerator such as magnesium oxide, and a flake inorganic filler such as flaked graphite. The amount of vulcanization agent is usually between about 0.5 and about 5 parts by weight per 100 parts of rubber, and the vulcanization accelerator is usually present in an amount between about 10 and about 40 parts by weight per 100 parts of rubber. The ingredients, including the elastomer, are milled together in a mill in the conventional manner for a period of time of about ten to about thirty minutes in which the temperature is usually maintained below about 150° F. The ingredients may be admixed prior to milling, or they may be admixed with the elastomer during milling. After the milling operation has been completed to thoroughly mix the ingredients of the vulcanization recipe into the elastomer, the composition is molded in a press for about 10 to about 30 minutes at a temperature between about 200° F. and about 350° F. Thereafter the molded composition is removed from the mold and cured in an oven at a temperature between about 350° F. and about 450° F. or higher for a period of several hours, to as much as 48 hours. The resulting molding composition has less than 2½% shrinkage, and usually about 1½% to about 2%, as compared with 3 to 5% when spherical filler is utilized. The Shore A hardness of the cured product is preferably between about 70 and about 90.

The following example is offered as a better understanding of the invention, the molding composition and recipe, and is not to be construed as unnecessarily limiting to the invention.

EXAMPLE

In accordance with the teachings of this invention, the following runs were made on the curing of the raw gum rubber of an elastomer of perfluoropropene and vinylidene fluoride copolymer in which twenty mol percent of the monomer perfluoropropene and eighty mol percent of the vinylidene fluoride were utilized in preparing the elastomer. The raw gum had a Shore A hardness of between about 40 and about 50 and a Mooney viscosity of between about 115 and about 150.

100 parts of the raw gum were placed in a mill and 20 parts of magnesium oxide and three parts of N,N'-dicinnamylidene-1,6-hexanediamine were milled into the raw gum. To the mill composition was also added during milling the quantities and type filler set out in Table I shown below. After thoroughly milling the mixture for about twenty minutes in which the temperature was maintained at about 150° F. or lower, the milled composition was molded in a press to a flat sheet measuring 3" x 6" x .08". The press cure was effected for twenty minutes at 320° F. and then the molded sheet was removed from the mold and cured in an electric furnace for twenty-four hours at 400° F. The width and length of the sheet was measured. The shrinkage from the original dimensions for both width and length was measured in sixty-fourths and totaled. This total change in sixty-fourths from the original is reported in the column titled "Shrinkage" of Table I. A Shore A hardness was taken on the sample and reported in the column titled "Hardness." A shrinkage of 11 (or 11/64) is equal to a shrinkage of approximately 2%. A maxmium Shore A hardness of about 95 is tolerable, and preferably the Shore A hardness should be between about 70 and about 90. The "Control" sample was prepared as above without the use of added filler.

TABLE I

| Filler | Filler parts per 100 | Shrinkage | Hardness, Shore A | Performance value |
|---|---|---|---|---|
| Control | | 22 | 66 | 145 |
| Talc (spherical) | 15 | 20 | 67 | 134 |
| Silica (spherical) | 15 | 20 | 67 | 134 |
| Do | 60 | 16 | 82 | 131 |
| Diatomaceous earth (spherical) | 15 | 19 | 67 | 127 |
| Do | 60 | 16 | 85 | 136 |
| Calcium carbonate (spherical) | 35 | 21 | 82 | 172 |
| Carbon black | 15 | 20 | 68 | 136 |
|  | 35 | 15 | 82 | 123 |
| (spherical) | 60 | 13 | 90 | 117 |
| Clay (flake) | 15 | 18 | 70 | 126 |
| Do | 35 | 11 | 85 | 93 |
| Graphite (flake) | 10 | 11 | 74 | 81 |
| Do | 35 | 5 | 85 | 42 |
| Talc (flake) | 10 | 13 | 73 | 95 |
| Do | 15 | 11 | 75 | 82 |
| Do | 35 | 6 | 83 | 50 |
| Mica (flake) | 35 | 13 | 76 | 100 |
| Do | 60 | 11 | 82 | 90 |
| Do | 80 | 10 | 86 | 86 |
| Synthetic Mica (flake) | 5 | 15 | 68 | 102 |
| Do | 10 | 10 | 79 | 79 |
| Do | 15 | 5 | 90 | 45 |

The column entitled "Performance Value" is a measure of whether or not the particular filler will give satisfactory performance in reducing shrinkage without an undue increase in hardness. The values in this column are obtained by multiplying the values of shrinkage by the value of hardness and dividing by 10. The quality of material having a performance value above 100 is not satisfactory. It will be noted that in every instance flake fillers have a satisfactory performance at some given quantity of filler whereas spherical materials will not give satisfactory performance at any quantity.

If insufficient hardness is obtained with flaked filler, addition of spherical filler may be utilized to increase the hardness. For example, both flake graphite and spherical graphite can be admixed with the elastomer in appropriate amount to give the desired limit on shrinkage and the required hardness.

Various modifications and alterations of the vulcanization recipe and the vulcanization conditions may be utilized and become obvious to those skilled in the art without departing from the scope of the invention.

What is claimed is:

1. A vulcanization composition comprising an elastomer having at least one half of the hydrogen substituent on its carbon atoms substituted with fluorine, a curing agent and a nonmetallic, inorganic flake filler having two of the dimensions greater than the third dimension by at least five times, and having particle size not greater than 200 mesh, said filler being present in a quantity of between about 5 and about 85 parts per 100 parts of said elastomer and sufficient to maintain
   (a) the shrinkage of said composition at less than about 2½ percent,
   (b) the hardness of said composition at below about 95 Shore A, and
   (c) the product of (1) the shrinkage in 64ths of an inch measured on the sum of the length and width of a 3" x 6" x .08" sample and (2) the Shore A hardness, divided by 10, below 100, after said composition has been press cured for about 20 minutes at a temperature of about 320° F. and post cured for about 24 hours at a temperature of about 400° F.

2. The composition of claim 1 in which the filler is flake graphite.

3. The composition of claim 1 in which the filler is flake talc.

4. The composition of claim 1 in which the filler is flake mica.

5. The vulcanized product of a vulcanization composition comprising an elastomer having at least one half of the hydrogen substituent on its carbon atoms substituted with fluorine, a curing agent and a nonmetallic, inorganic flake filler having two of the dimensions greater than the third dimension by at least five times, and having particle size not greater than 200 mesh, said filler being present in a quantity of between about 5 and about 85 parts per 100 parts of said elastomer and sufficient to maintain
  (a) the shrinkage of said composition at less than about 2½ percent,
  (b) the hardness of said composition at below about 95 Shore A, and
  (c) the product of (1) the shrinkage in 64ths of an inch measured on the sum of the length and width of a 3″ x 6″ x .08″ sample and (2) the Shore A hardness, divided by 10, below 100,
after said composition has been press cured for about 20 minutes at a temperature of about 320° F. and post cured for about 24 hours at a temperature of about 400° F.

6. A vulcanized elastomer having at least one half of the hydrogen substituents on its carbon atoms substituted with fluorine, said elastomer containing between about 10 and about 40 parts of flake graphite per 100 parts of elastomer, said filler having two of the dimensions greater than the third by at least five times.

7. The vulcanized composition of claim 1 in which said elastomer is a copolymer of perfluoropropene and vinylidene fluoride.

References Cited

UNITED STATES PATENTS

| | | | |
|---|---|---|---|
| 3,008,916 | 11/1961 | Smith | 260—41 |
| 2,968,649 | 1/1961 | Pailthorpe et al. | 260—80.77 |
| 3,011,995 | 12/1961 | Smith | 260—41B |
| 3,041,316 | 6/1962 | Griffin | 260—41B |
| 3,051,677 | 8/1962 | Rexford | 260—41 |
| 3,243,411 | 3/1966 | Tawney et al. | 260—41 |

OTHER REFERENCES

Conroy et al., "Kel-F Elastomers," Rubber Age, 1955, vol. 76, No. 4, pp. 543–550.

Freeman, "Silicones" Iliffe Books, Ltd., London, 1962, p. 79.

Oleesky et al., "Handbook of Reinforced Plastics," Reinhold, pp. 194, 195, 197–199, 202, 212.

MORRIS LIEBMAN, Primary Examiner

S. L. FOX, Assistant Examiner